United States Patent [19]
Watanabe et al.

[11] Patent Number: 5,307,260
[45] Date of Patent: Apr. 26, 1994

[54] ORDER ENTRY APPARATUS FOR AUTOMATIC ESTIMATION AND ITS METHOD

[75] Inventors: Masahiro Watanabe; Hisashi Onari; Kichie Matsuzaki; Hideaki Matoba, all of Yokohama; Hidetoshi Inaba, Sapporo, all of Japan

[73] Assignee: Hitachi, Ltd., Tokyo, Japan

[21] Appl. No.: 619,618

[22] Filed: Nov. 29, 1990

[30] Foreign Application Priority Data

Nov. 29, 1989 [JP] Japan .................. 1-307777

[51] Int. Cl.[5] .............. G06F 15/22; G06F 15/24; G06G 7/52
[52] U.S. Cl. .................. 364/401; 395/22
[58] Field of Search .......... 364/401, 403, 468, 474.24, 364/225, 917, 918; 395/21, 22, 24, 904, 924

[56] References Cited

U.S. PATENT DOCUMENTS

| | | | |
|---|---|---|---|
| 4,408,291 | 10/1983 | Gunzberg et al. | 364/470 |
| 4,459,663 | 7/1984 | Dye | 364/403 |
| 4,644,480 | 2/1987 | Haruna et al. | 364/552 |
| 4,807,108 | 2/1989 | Ben-Arieh et al. | 364/468 |
| 4,887,218 | 12/1989 | Natarajan | 364/468 |
| 4,959,686 | 9/1990 | Spallone et al. | 364/401 |
| 4,972,318 | 11/1990 | Brown et al. | 364/401 |
| 4,984,155 | 1/1991 | Geier et al. | 364/401 |
| 4,984,180 | 1/1991 | Wada et al. | 364/474.24 |
| 5,101,352 | 3/1992 | Rembert | 364/401 |
| 5,115,400 | 5/1992 | Watanabe et al. | 364/474.25 |

*Primary Examiner*—Gail O. Hayas
*Assistant Examiner*—Laura Brutman
*Attorney, Agent, or Firm*—Antonelli, Terry, Stout & Kraus

[57] ABSTRACT

Order entry apparatus for automatic estimation a transformation model comprising a pattern composed of a plurality of parameters representing custom product specifications, production line conditions and factors for composing the estimates for production cost and completion date. The parameters of this transformation model are specified by learning, leading to estimation for the requested product specifications, in broad consideration of conditions such as those of the production line. The use of a neural network model as this pattern transformation model makes pattern transformation more flexible and pattern learning more efficient. Estimation accuracy is also increased by entering values of predicted charges in production line conditions such as loads or stock obtained from resource requirements planning, process design, capacity requirements planning, etc.

13 Claims, 8 Drawing Sheets

EXAMPLES OF INPUT PATTERN ITEMS

| |
|---|
| (1) PRODUCT SPECIFICATIONS (CASE OF CARS)<br>　　SELECTION OF OPTIONS (SELECTION:1, NON-SELECTION:0)<br>　　BODY SIZE<br>　　ENGINE POWER |
| (2) QUANTITY OF INVENTORY OF PARTS (OR THEIR TRANSITION) |
| (3) LINE CONDITIONS<br>　　QUANTITY OF BACKLOG<br>　　LOAD OF EACH WORK CENTER, RATIO OF EMERGENCY JOBS AND NUMBER OF PROCESS STEPS<br>　　TRANSITION OF FORGOING CONDITIONS OF WORK CENTER |
| (4) SALES STRATAGY<br>　　PRIORITY OF ORDER<br>　　PROFIT RATE |
| (5) LEAD TIME OF DESIGN<br>　　QUANTITY OF BACKLOG<br>　　DEGREE OF NON-STANDARD |

FIG. 5

OUTPUT VALUE OF FEATURE EXTRACTION LAYER =
  $f ( \sum_{INPUT\ LAYER}$ OUTPUT OF INPUT LAYER × WEIGHT PARAMETER OF FEATURE EXTRACTION LAYER )

OUTPUT VALUE OF INTERMEDIATE LAYER =
  $f ( \sum_{FEATURE\ EXTRACTION\ LAYER}$ OUTPUT OF FEATURE EXTRACTION LAYER × WEIGHT PARAMETER OF INTERMEDIATE LAYER )

OUTPUT VALUE OF OUTPUT LAYER =
  $f ( \sum_{INTERMEDIATE\ LAYER}$ OUTPUT OF INTERMEDIATE LAYER × WEIGHT PARAMETER OF OUTPUT LAYER )

f : SIGMOID FUNCTION

ORDER ENTRY APPARATUS FOR AUTOMATIC ESTIMATION AND ITS METHOD

BACKGROUND OF THE INVENTION

1. Field of the Invention

The present invention relates to an estimating apparatus for estimating prices and due dates of products and providing such estimates to a CAD apparatus and to the corresponding methods in custom job order production systems. The invention is particularly concerned with a pattern learning order entry apparatus provided with the function of entering product specifications of a product and estimating prices and due dates in consideration of these product specifications and production line conditions. This function is performed in response to a product specification request and the method of producing the products. For example, the present invention provides a pattern learning automatic estimation apparatus having such mechanisms as design implementation in consideration of information such as production cost for the design specifications that the designer has entered and its method.

DESCRIPTION OF THE PRIOR ART

In the past, apparatuses for estimating product prices, such as one described in Japanese Laid-Open Patent 63-12068, have used built-in static pictures of products in catalogs and files containing information about the products specified to display the picture of a product and its information when the product is selected by a client. It further outputs an estimate by searching a fixed price and due date table when estimation conditions are specified.

The above-mentioned prior art is applicable only for estimations regarding products whose specifications are among a limited number of specifications already determined. Especially when estimating a due date, it outputs only a value specific to one of such products, regardless of production line conditions. However, today's clients require more varied products, so there is a strong demand for custom orders varying from article to article. In the prior art it is impossible to make a quick but accurate estimate of prices and due dates for custom specifications varying with the product article, and it is only possible as a result of carefully designing products and planning their production processes. In particular the estimation of due dates in consideration of the specific production line conditions is utterly impossible with the prior art, and only depends upon sales people's arbitrary guesses.

SUMMARY OF THE INVENTION

A primary object of the present invention is to provide a pattern learning order entry apparatus and its corresponding method, for solving the problem of the above prior art, which indicates accurate prices and due dates according to custom product specifications, varying with the client, as soon as the specifications are entered so that such prices and due dates can help to evaluate the custom specifications and product orders.

An object of the present invention is to provide the above-described pattern learning order entry apparatus and method further having means for promptly displaying an estimate of due dates in consideration of production line conditions as well as custom product specifications.

Another object of the present invention is to provide a pattern learning order entry apparatus and its corresponding method for estimating product prices and due dates, even when product categories subject to the above-mentioned order entry apparatus are changed or even when production equipment is changed, all without preparing special estimation procedures or data for such changes.

A further object of the present invention is to provide a pattern learning CAD apparatus, and a corresponding method, having means for displaying production costs for custom design specifications as soon as the designer enters the specifications, and mean for implementing the product cost considerations in to the custom design specifications.

To achieve the above-described objects, the present invention is characterized by entering requested custom product specifications, storing, in a memory, parameters of a transformation model for deriving factor values for deriving estimates based upon designs having a plurality of parameters representing product specifications; and determining the factor values for deriving estimates for a custom ordered product by a pattern transformation defined by the stored parameters of the pattern transformation model, when a pattern constructed by a plurality of parameters representing requested custom product specifications is inputted as the above requested specifications.

The pattern to be entered into the above pattern transformation model may include data regarding conditions for supplying the product whenever it is necessary. The above data regarding product supply conditions are, for example, those conditions concerning the production line where the product is to be produced, and the above factors derive product-specific estimates including the price and due date of the product.

Now, the above characteristics will be described by using concrete examples. An example, the above pattern learning order entry apparatus is used for estimating prices and/or due dates to promptly display prices and/or due dates for requested custom product specifications.

Further a pattern learning order entry apparatus is equipped with a line condition database for making estimates taking into account conditions of the production line, thus data regarding the production line, in addition to required specifications, is input to the apparatus for estimating prices and/or due dates. In this case, a more responsive pattern learning is derived from the apparatus for estimating prices and/or due dates by using a method such as the neural network theory.

A further example is a pattern learning order entry apparatus capable of increasing the accuracy of the estimation of due dates by using values of predicted change on the production line regarding resource requirements planning, process design, capacity requirements planning, and so on, as information to be input to the apparatus for estimating prices and/or due dates.

A still further example is a pattern learning CAD apparatus, in accordance with the present invention. This pattern learning CAD apparatus uses its built-in pattern learning apparatus for estimating production costs in order to subsequently display the production costs for the custom design specifications the designer has entered.

The above pattern learning apparatus is capable of implementing estimation of prices and/or due dates in broad consideration of specification requests and production line conditions by using a pattern transformation model in an apparatus for estimating prices and/or due dates; providing a pattern learning ability which increases the accuracy of estimates by changing parameters of a pattern transformation model and by relating past specification requests and production line conditions to past real production cost and lead time data and of getting ready for further estimates of prices and/or due dates by storing for each product category the parameters of the models resulting from learning in a memory for parameters of estimation models.

A neural network model can be utilized as the above pattern transformation model thus enabling the above-described estimations and construction of a pattern transformation model, even when it is almost impossible to figure out the relationship of requested custom specifications and production line conditions to prices and/or due dates in a production line of the subject product category.

Furthermore, since in the case of estimation of due dates, the accuracy of estimation increases by the use of production line conditions for further estimations, value of predictions are provided regarding resource requirements planning, process design, capacity requirements planning, and so on, concerning any change in the production line, such as load change. These values and inventory product change are available as the input to an apparatus for estimating prices and/or due dates in the future.

In addition, the above pattern learning CAD apparatus uses a pattern transformation model in its built-in apparatus for estimating production costs order to estimate production cost by applying the learning function of the pattern transformation model to resultant data of custom product specifications and production costs even when the relation between product specifications and production cost is not clearly grasped.

The foregoing and other objects, advantages, manner of operation and novel features of the present invention will be understood from the following detailed description when read in connection with the accompanying drawings.

BRIEF DESCRIPTION OF THE DRAWINGS

In the accompanying drawings.

DETAILED DESCRIPTION OF THE PREFERRED EMBODIMENTS

Now, embodiments of the present invention will be described in reference to FIGS. 1 to 9.

Figure 1:
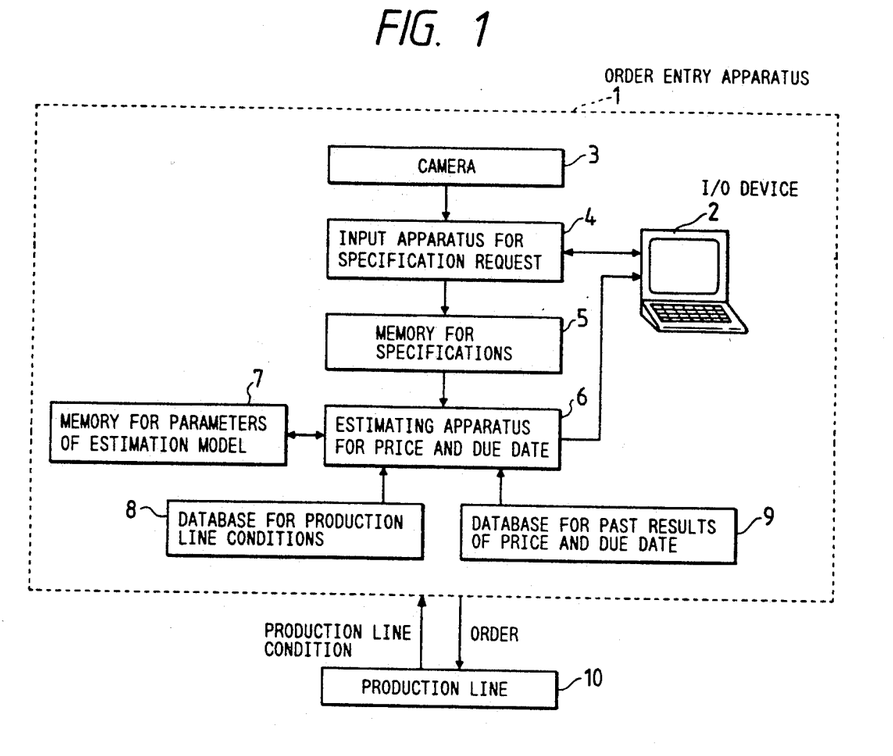
FIG. 1 is a schematic illustration of a pattern learning order entry apparatus which embodies the present invention.
Figure 7:
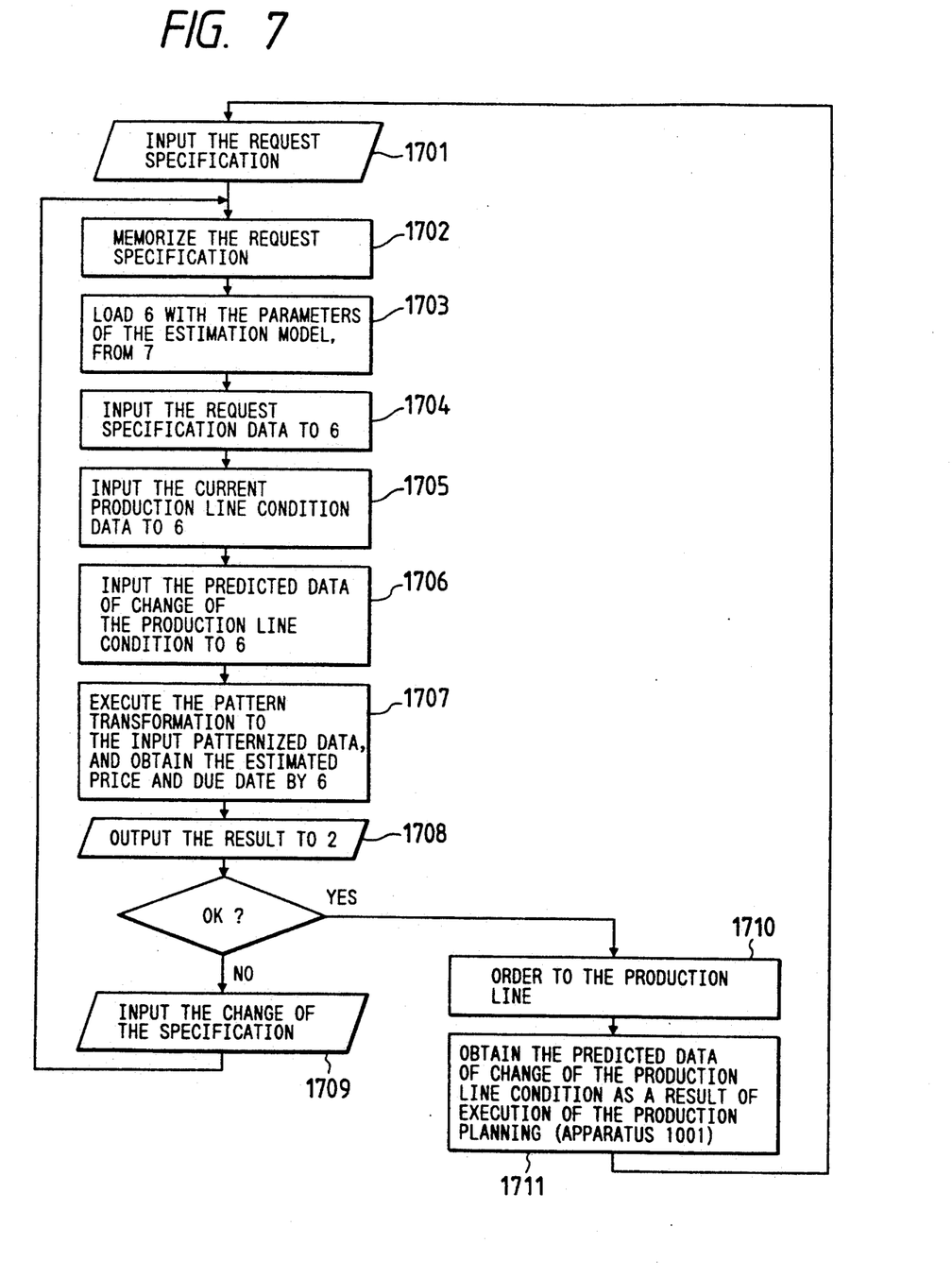
FIGS. 7 and 8 are flowcharts of the operation in accordance with the present invention.

FIG. 1 is a schematic illustration of a pattern learning order entry apparatus which embodies the present invention. In FIG. 1, an order entry apparatus 1 is composed of an I/O device (display) 2, camera 3, input apparatus 4 for specification request, memory 5 for specifications, pattern learning apparatus 6 for estimating prices and due dates, memory 7 for parameters of estimation models, database 8 for production line conditions and database 9 for records of past prices and due dates, and gives orders to a production line 10 and production 11 conditions and actual production results to produce an estimation. The flowchart in FIG. 7 shows the entire processing by this embodiment in FIG. 1.

In the constitution illustrated in FIG. 1, clients or sales persons control the order entry apparatus 1 by using the I/O device 2, which is the display for the operators' use, entering specification requests to obtain estimated prices and due dates, changing the specification request accordingly and finally giving a custom order. Here, the input apparatus 4 for specification request can be used to determine specifications on the basis of the information about samples shown to the camera 3. The entered specification request is stored in the memory 5 for specification (1702), and is used by the estimating apparatus 6 for prices and due dates. The estimating apparatus 6 for estimating prices and due dates provides to the I/O device 2 an estimated price and due date for a product whose requested specification has been entered (1708). The values are obtained by referring to the database 8 for production line conditions obtained by monitoring the production line 10 and by referring to the database 9 for records of past prices and due dates, and they applying pattern transformation to the result of the reference (1704~1707). The parameters of a model for this pattern transformation are stored in the memory 7 for parameters of estimation models. These parameters are always updated into appropriate values by learning in such a way that real production cost and lead time data in the past are close to their estimates. With this embodiment, it is possible to estimate the price and due date for a product by considering conditions of the production line as soon as the specification request is entered (1711). The estimating apparatus 6 for estimating prices and due dates using pattern transformation will now be described with respect to its construction.

Figure 2:
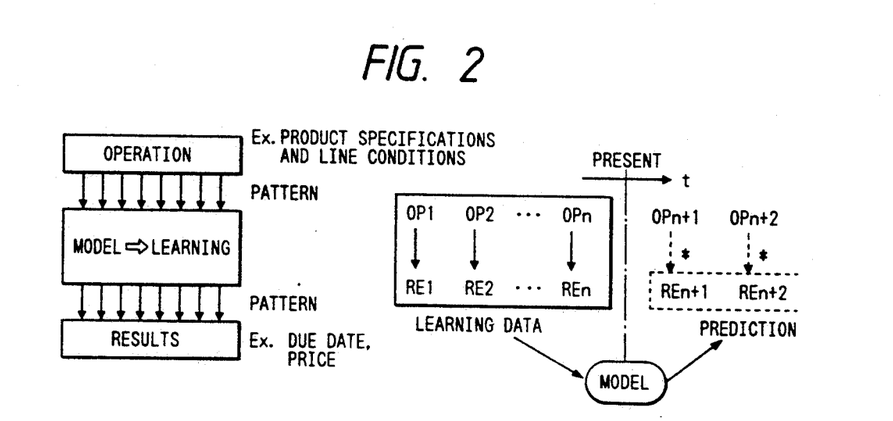
FIG. 2 is a schematic view of the estimating apparatus for prices and due dates using the pattern transformation in FIG. 1.

FIG. 2 is a schematic view of the method of estimating prices and due dates employed by the estimating apparatus 6 for estimating prices and due dates in FIG. 1 using the pattern transformation. In FIG. 2, the relationship of product specifications and such conditions as those of the production line to prices and due dates is identified with the pattern transformation from an operation to its result, so the past relationship of product specifications and such conditions as those of the production line to prices and due dates is used as the data for learning to determine the parameters of a pattern transformation model. This pattern transformation model resulting from learning is used to predict prices and due dates for new specification requests or new conditions such as of the production line. Upon this concept, the example of constitution of an estimating apparatus 6 for estimating prices and due dates, which is illustrated in detail in FIG. 3, is based.

Figure 3:
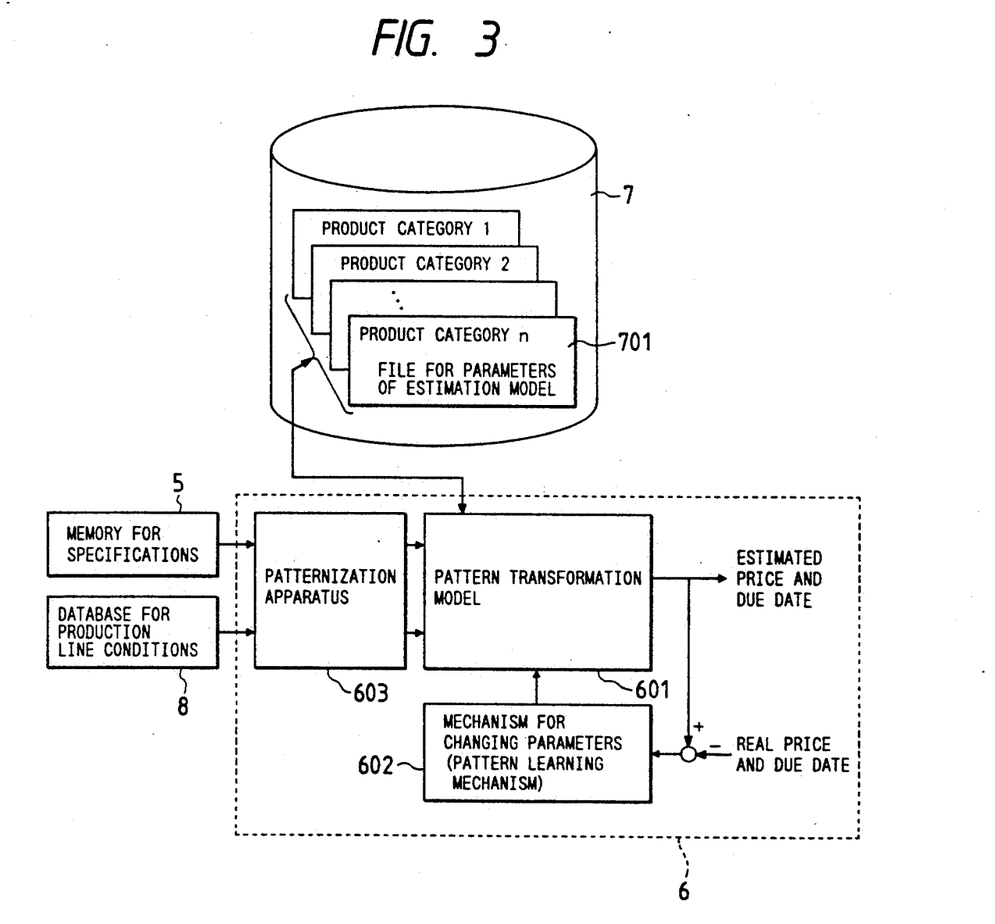
FIG. 3 is a view of a constitutional example of the estimating apparatus for prices and due dates shown in FIG. 1.
Figure 8:
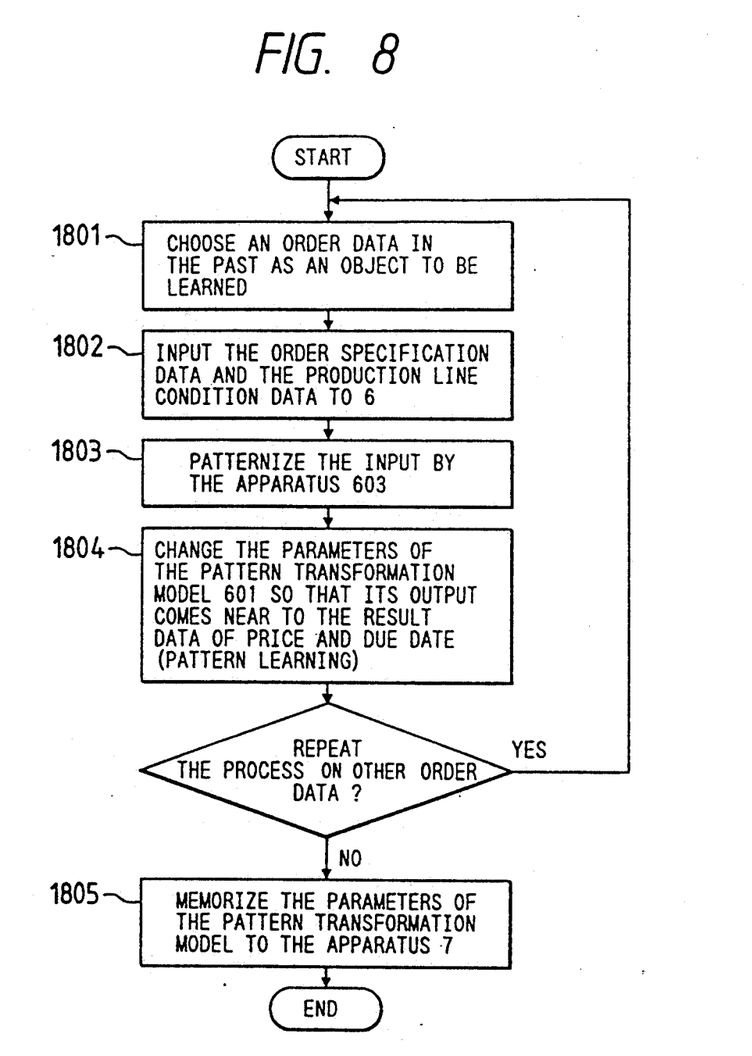

FIG. 3 is a view of the construction of an example of the estimating apparatus 6 for estimating prices and due dates shown in FIG. 1. In FIG. 3, the memory 7 stores files 701 for parameters of estimation models each for a product category. The estimating apparatus 6 for estimating prices and due dates uses these files as parameters of a pattern transformation model. Data in the memory 5 for specifications and in the database 8 for production line conditions are changed by a patternization apparatus 603 into a type suitable for entry into a pattern transformation model 601. Then, the data are entered into the pattern transformation model 601, from which they are output as estimated prices and due dates. Further, these estimates are compared with the records of real prices and due dates, and according to this comparison a mechanism 602 for changing parameters (pattern leaning mechanism) modifies the pattern transformation model 601 with the result being that prices and due dates can be even more accurately estimated. This constitution implements an estimating apparatus 6 for estimating prices and due dates which is capable of taking into consideration such conditions as those of the production line by pattern learning. Now, the pattern learning operation of the apparatus 6 shown in FIG. 3 will be described in reference to the flowchart in FIG. 8. Input data are patternized by a process 1803 shown in FIG. 8, and the parameters of the pattern transformation model 601 (shown in FIG. 3) are changed in the process of learning (1804). The result of this learning is stored in the memory 7 for parameters of estimation models (1805). This estimating apparatus 6 for estimating prices and due dates needs a pattern of items to be input to it, an example of which is shown in FIG. 4.

Figure 4:
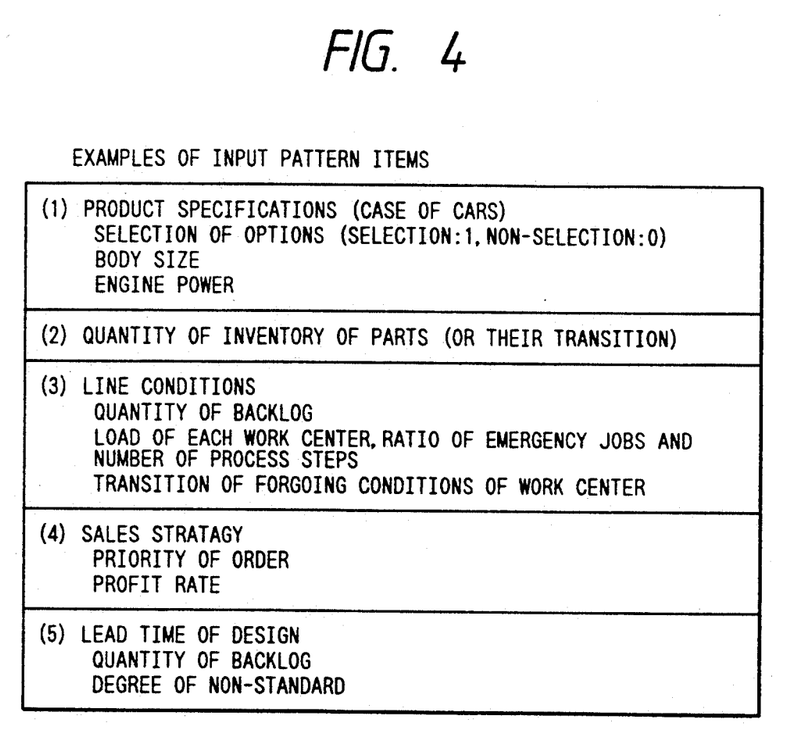
FIG. 4 is an explanatory representation of an example of a group of input items for the estimating apparatus for prices and due dates shown in FIG. 1.

FIG. 4 is an explanatory representation of an example of a group of input items for the estimating apparatus 6 for estimating prices and due dates shown in FIG. 1 (and FIG. 3). In FIG. 4, there are items such as those concerning product (e.g. car) specifications, quantity of inventory parts, production line conditions, sales strategy and design. A pattern of values input thereto is specified by transforming items having continuous quantity, e.g. an analog value between 0 and 1, into items having discrete matters like selection between presence and absence into 0 or 1, items which vary with time into a set of values, each of which is a result of sampling examinations and is expressed as a value between 0 and 1. This method of using entering a pattern of values representing a group of items in order for apply pattern transformation and modeling to the estimation of prices and due dates and they outputting the result, makes it possible to get more accurate estimate of prices and due dates on the basis of macroscopic viewpoints than those provided by complicated product design or production simulation.

Figure 5:
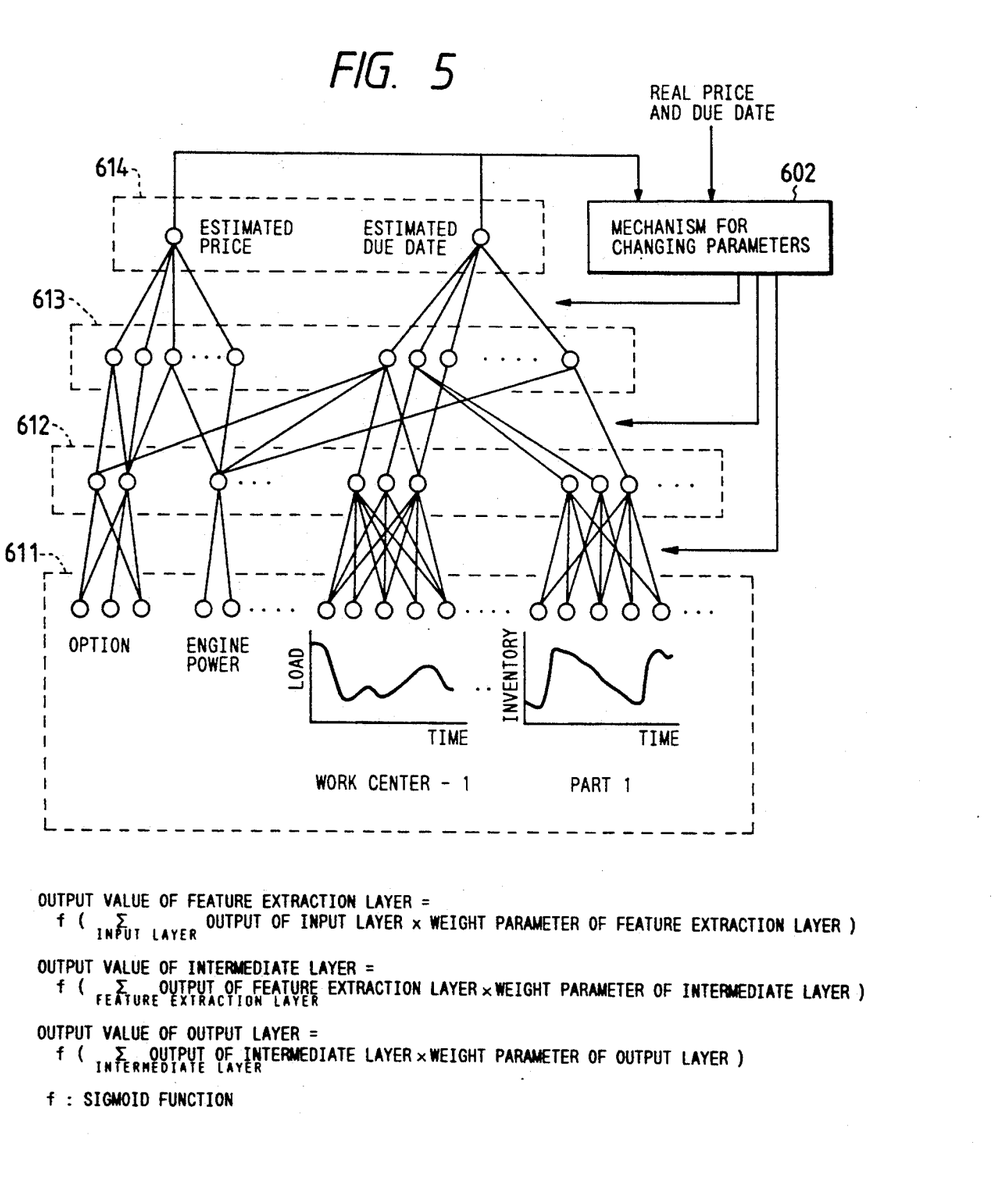
FIG. 5 is a constitutional representation of an embodiment of the estimating apparatus for prices and due dates composed of a neural network model which is shown in FIG. 1.

FIG. 5 is a representation of the constitution of an embodiment of the estimating apparatus 6 for estimating prices and due dates, which is shown in FIG. 1 (and FIG. 3), composed of a neural network model. In reference to FIG. 5, a detailed description of the neural network model theory may be found in the test "Parallel Distributed Processing" by D. B. Rumelhart, J. L. McClelland and the PDP Research Group, MIT Press, 1986. This estimating apparatus 6 for prices and due dates is composed of, for instance, an input layer 611 consisting of cells into which are entered value patterns, a feature extraction layer 612 consisting of cells for compressing entered information, an intermediate layer 613 and a layer 614 for finally outputting estimated prices and due dates. This output, then, is compared with real prices and due dates when they are known after production, and according to this comparison the mechanism 602 for changing parameters performs transformation model learning by changing weight parameters between layers so as to obtain a more accurate estimate of prices and due dates. This constitution implements pattern transformation along with learning concerned with it. There is another method for increasing estimation accuracy, which is shown in FIG. 6.

Figure 6:
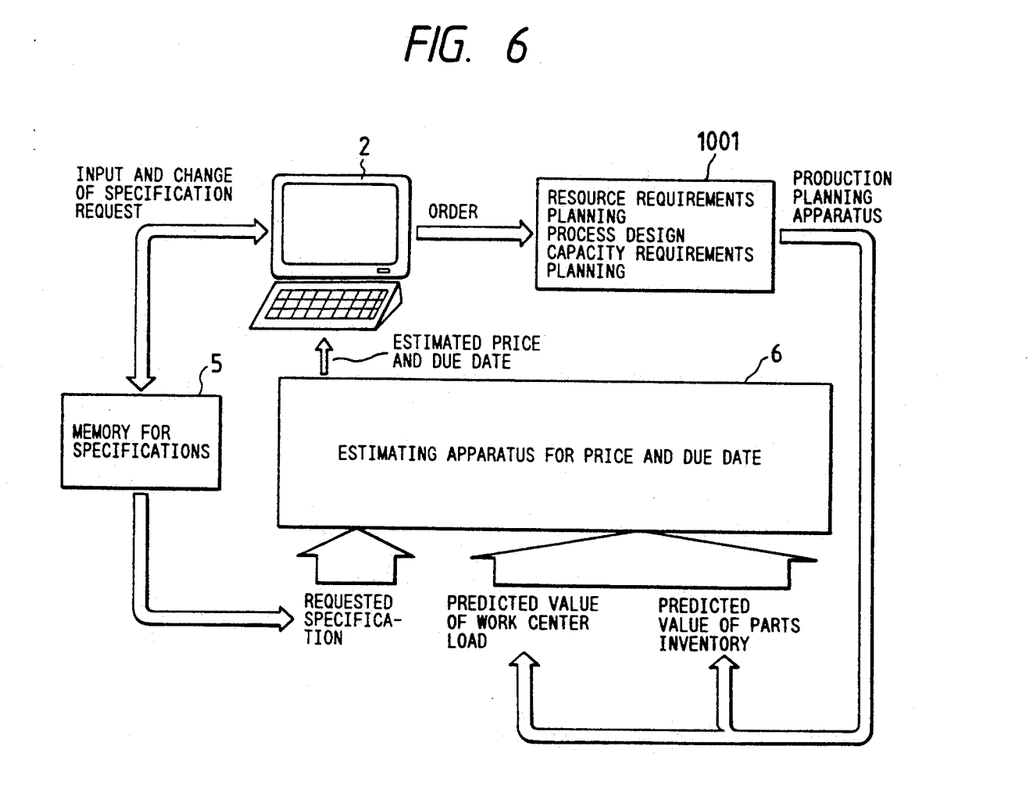
FIG. 6 is a constitutional representation of an embodiment of means for increasing the estimation accuracy of the apparatus shown in FIG. 1.

FIG. 6 is a representation of the constitution of an embodiment of means for increasing the estimation accuracy of the apparatus shown in FIG. 1. In addition, the flow of the operations of this means will be described in reference to FIG. 7 together with FIG. 3. In FIG. 6, a production planning apparatus 1001 performs resource requirements planning, process design, capacity requirements planning, and so forth used in the production of past orders, predicts a future pattern concerning changes such those as of work center loads and of inventory parts and send it all as part of the input to the estimating apparatus 6 for estimating pries and due dates (1711).

In this manner, it is possible to add to an estimate concerning a product to be ordered the influence of a product already ordered by not yet produced upon the due date for the former product.

Figure 9:
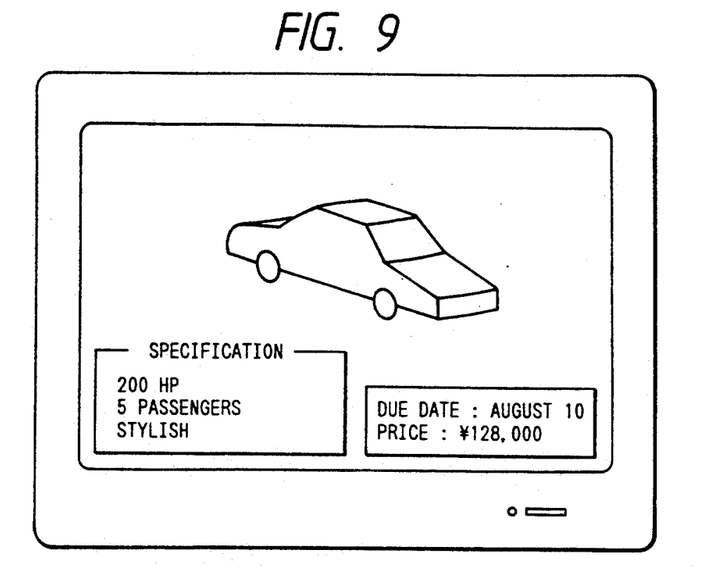
FIG. 9 is a view of an example of a method of displaying on the screen of the I/O device shown in FIG. 1.

FIG. 9 is a view of an example of a method of displaying on the screen of the I/O device (display) 2 shown in FIG. 1. In FIG. 9, a soon as a client or sales person enters or changes a specification request, the estimated price and due date for the specification are calculated, and the result is displayed at a particular location on the screen of the I/O device 2. This function facilitates judgment as to whether or not a specification needs to be changed before the specified order is given to the production line.

Figure 10:
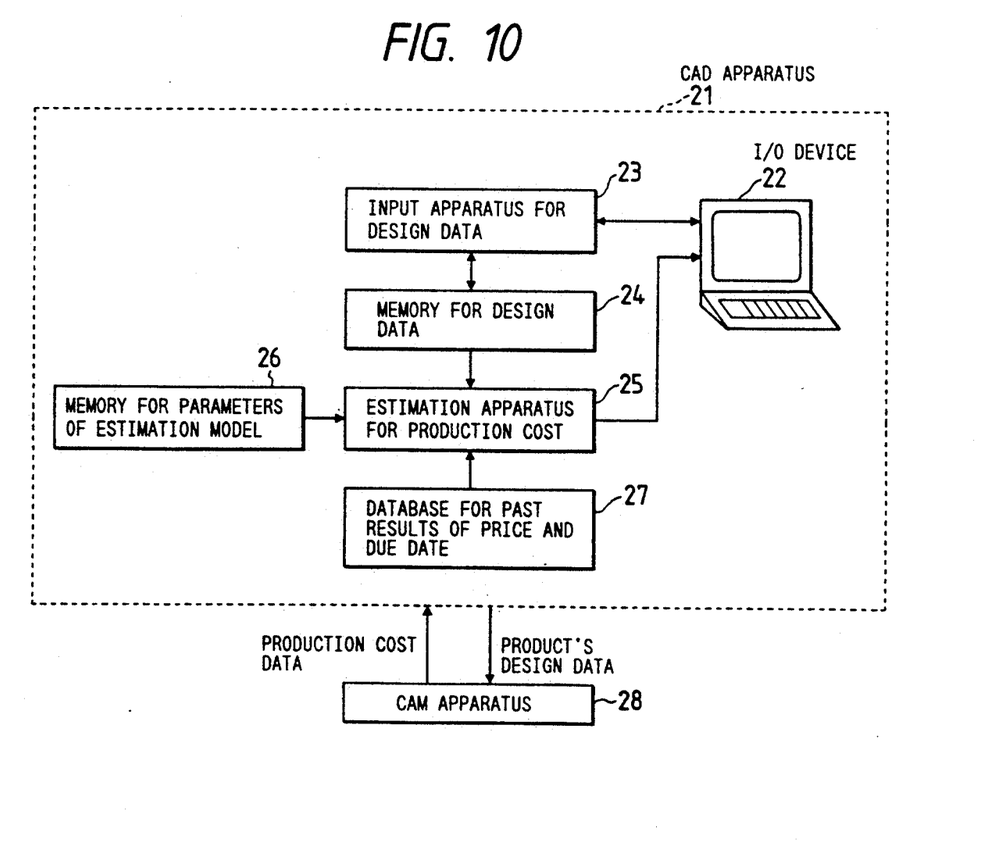
FIG. 10 is a constitutional representation of a pattern learning CAD apparatus, which embodies the present invention.

FIG. 10 is a representation of the constitution of a pattern learning CAD apparatus, which embodies the present invention, for implementing design in consideration of production cost. In FIG. 10, the CAD apparatus 21 is composed of an I/O device (display) 22, input apparatus 23 for design data, memory 24 for design data, pattern learning estimation apparatus 25 for production cost, memory 26 for parameters of estimation models and database 27 for records of past production cost, and is for sending products' determined design data to a CAM apparatus 28 and then receiving the real production cost data for the products.

With the CAD apparatus 21 having this constitution, the designer controls the entire unit by using the I/O device 22, by entering design data and receiving an estimate of production cost for the design. First, the input apparatus 23 for design data processes the design data, and then the memory 24 for design data stores it, and the estimation apparatus 25 for production cost uses it. This estimation apparatus 25 for estimating production costs performs pattern transformation by referring to the database 27 for records of past production costs where there is an accumulation of production cost data obtained from the CAM apparatus 28 so that the apparatus 25 can send an estimate of production costs to the I/O device 22 every time the product's design data is entered or changed. Here, the parameters of a model to which pattern transformation is to be applied are stored in the memory 26 for parameters of estimation models, and are always updated into appropriate values as a result of learning in such a way that real production data in the past are close to their estimates. Thus, it is possible for the designer to see an accurate production cost for the design data upon entering the design data even when the influence of design specifications has been unknown to him upon production cost, in other words, for him to design in consideration of production cost.

According to the present invention, as understood from the above constitution, the following advantages are available:

Prompt display of estimates of specifications varied according to the client helps to evaluate the changing of specification and the specified custom orders.

In addition, it is possible to estimate a due date in consideration those regarding such conditions as of production lines as well as custom product specifications.

Furthermore, even when a new product category or altered production equipment is to be handled by the order entry apparatus, such a change can automatically be adapted to its estimating apparatus because of the accumulation of data on real periods and costs spent on production. Therefore, no preparation of new estimation procedures or data is necessary.

Still further, incorporating an apparatus for estimating production cost according to the same principle into a CAD apparatus implements design which takes production cost into consideration.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. An order entry apparatus for automatic estimation regarding a specified product, said order entry apparatus comprising:
   user input means for entering requested product specifications for said specified product;
   memory means for storing parameters of said requested product specifications for inputting to at least a pattern transformation model;
   wherein said pattern transformation model comprises data processing cells and weighted parameters interconnecting said data processing cells;
   patternizing means for generating a pattern to input to said pattern transformation model, based upon said entered requested product specifications; and
   estimating means including said pattern transformation model for deriving an estimate item including a date of production completion for said specified product based upon said generated pattern input to said transformation model.

2. An order entry apparatus as set forth in claim 1, further comprising learning means for determining values of said weighted parameters interconnecting said data processing cells.

3. An order entry apparatus as set forth in claim 2, further comprising control means for changing the value of said estimated item based upon an altered product specifications, when said requested product specifications are altered.

4. An order entry apparatus as set forth in claim 1, wherein said pattern input to said pattern transformation model includes data regarding conditions for supplying said product.

5. An order entry apparatus as set forth in claim 4, wherein said data regarding said conditions for supplying said product include data regarding production line conditions producing said product, and said estimate item further includes an estimated price for said product.

6. An order entry apparatus as set forth in claim 4, wherein said data regarding said conditions for supplying said product include data concerning predicted changes in said production line conditions, said data obtained in accordance with resource requirements planning, process design, data regarding past production orders and/or capacity requirements planning.

7. A CAD apparatus comprising:
   an input apparatus for entry of product design data for a specified product;
   memory means for storing parameter values of the entered product design data for inputting to a pattern transformation model;
   wherein said pattern transformation model comprises data processing cells and weighted parameters interconnecting said data processing cells;
   means for learning said weighted parameter for determining values of indexes relating to productivity of said specified product as close as desired values;
   patternizing means for generating a pattern for inputting to said pattern transformation model based upon said entered product design data; and
   means for determining said indexes relating to the productivity of said specified product based upon said weighted parameters being determined by the learning means.

8. A method of automatic estimation for orders, said method comprising the steps of:
   determining product specifications for a specified product;
   storing in a memory, parameters of the determined product specifications for a pattern transformation model;
   wherein said pattern transformation model comprises data processing cells and weighted parameters interconnecting said data processing cells;
   generating a pattern to patternize to said pattern transformation model base upon said determined product specifications; and
   determining values of estimate items for said specified product based upon the pattern generated in said generating step, input to said pattern transformation model by use of said input generated pattern.

9. An estimation method as set forth in claim 8, further comprising a learning step of learning values of said weighted parameters.

10. An estimation method as set forth in claim 8, wherein said pattern to patternize to said pattern transformation model includes data regarding conditions for supplying said product.

11. An estimation method asset forth in claim 10, wherein said data regarding conditions for supplying said product include data regarding production line conditions for producing said specified product, and said estimate items for include price and/or date of production completion for said specified product.

12. A method of CAD processing comprising the steps of:
   entering product design data for a specified product;
   storing in a memory device, parameter values of the entered product design data for inputting to a pattern transformation model;
   wherein said pattern transformation model comprises data processing cells nd weighted parameters interconnecting said data processing cells;
   learning said weighted parameters for determining values of indexes relating to productivity of said specified product as close as desired values;
   generating a pattern for inputting to said pattern transformation model based upon said entered product design data; and
   determining said indexes based upon said weighted parameters determined in the learning step.

13. A CAD processing method as set forth in claim 12, wherein said the determined indexes include production costs.

* * * * *